(12) United States Patent
Campbell

(10) Patent No.: US 9,323,551 B2
(45) Date of Patent: Apr. 26, 2016

(54) MODIFYING CODE SEQUENCE WITH REPLACEMENT PARTS OF WHICH NON-BEGINNING PARTS TRIGGER EXCEPTION WHEN JUMPED TO

(75) Inventor: Neil A. Campbell, Derbyshire (GB)

(73) Assignee: International Business Machines Corporation, Armonk, NY (US)

( * ) Notice: Subject to any disclaimer, the term of this patent is extended or adjusted under 35 U.S.C. 154(b) by 817 days.

(21) Appl. No.: 13/345,221

(22) Filed: Jan. 6, 2012

(65) Prior Publication Data

US 2012/0179897 A1    Jul. 12, 2012

(30) Foreign Application Priority Data

Jan. 7, 2011    (EP) ...................................... 11150356

(51) Int. Cl.
*G06F 9/44* (2006.01)
*G06F 9/455* (2006.01)
*G06F 9/30* (2006.01)
*G06F 9/38* (2006.01)
*G06F 9/45* (2006.01)
*G06F 11/30* (2006.01)

(52) U.S. Cl.
CPC .............. *G06F 9/45525* (2013.01); *G06F 8/40* (2013.01); *G06F 8/52* (2013.01); *G06F 9/3005* (2013.01); *G06F 9/3861* (2013.01); *G06F 9/45516* (2013.01); *G06F 11/30* (2013.01)

(58) Field of Classification Search
CPC .............................. G06F 9/328; G06F 9/30181
USPC .............................................. 712/E9.035, 226
See application file for complete search history.

(56) References Cited

U.S. PATENT DOCUMENTS

| 6,865,667 | B2 * | 3/2005 | Moyer et al. ................... 712/234 |
| 8,024,554 | B2 * | 9/2011 | Chauvel ......................... 712/226 |
| 8,522,239 | B1 * | 8/2013 | Dobrovolskiy et al. .......... 718/1 |

* cited by examiner

Primary Examiner — Kenneth Kim
(74) Attorney, Agent, or Firm — Eustace P. Isidore; Yudell Isidore PLLC

(57) ABSTRACT

A technique of modifying a code sequence for a processor includes identifying a set of one or more target instructions in the code sequence. A replacement instruction is selected that includes a set of replacement instruction parts. A length of each of the replacement instruction parts corresponds to a minimum instruction length for an instruction set of the processor. The replacement instruction parts include a first instruction type and one or more second instruction types that are each configured as exception instructions if processed in isolation from the first instruction type. The replacement instruction is then substituted for the set of one or more target instructions in the code sequence for processing by the processor.

20 Claims, 6 Drawing Sheets

| | | | |
|---|---|---|---|
| 0: | 0F | add r1,1 | # add 1 to register r1 |
| 1: | 10 | mul r1,r1 | # multiply r1 by r1 |
| 2: | 22 12 34 | jmp 1234 | # jump to code at address 1234 |
| 5: | 0E | sub r1,1 | # subtract 1 from r1 |
| 6: | 11 | mul r1,r2 | # multiply r1 by r2 |

Figure 2a

| | | | |
|---|---|---|---|
| 0: | 22 55 55 | jmp 5555 | # New jump instruction |
| 3: | 12 34 | div r2,r3 | # divide r2 by r3 |
| 5: | 0E | sub r1,1 | # subtract 1 from r1 |
| 6: | 11 | mul r1,r2 | # multiply r1 by r2 |

Figure 2b

| | | | |
|---|---|---|---|
| 0: | FF E5 E5 E5 E5 | jmp 5555 | # New jump instruction |
| 6: | 11 | mul r1,r2 | # multiply r1 by r2 |

Figure 2c

MODIFYING CODE SEQUENCE WITH REPLACEMENT PARTS OF WHICH NON-BEGINNING PARTS TRIGGER EXCEPTION WHEN JUMPED TO

This application claims priority to European Patent Application No. EP11150356, entitled "A METHOD, APPARATUS OR SOFTWARE FOR MODIFYING A CODE SEQUENCE FOR A PROCESSOR," filed Jan. 7, 2011, the disclosure of which is hereby incorporated herein by reference in its entirety.

BACKGROUND

1. Field

This disclosure relates generally to a processor code sequence and, more specifically, to modifying a processor code sequence.

2. Related Art

A computer may be configured to include a dynamic code optimization program. In general, code optimization programs are configured to monitor programs running on a computer in order to identify techniques to speed-up processing of the monitored programs. Commonly, performance-monitoring hardware includes mechanisms that can be used to identify regions of code that are most frequently executed and/or where performance is poor. Such identified regions of code are preferable candidates for code optimization. Having identified such regions of code, a code optimization program can analyze the code and generate an alternative optimized version of the code that is configured to improve the performance of the monitored program. The code optimization program then diverts processing when appropriate to the optimized code. For example, original code may be patched so as to jump to optimized code. Alternatively, special hardware mechanisms may be used that detect specific program addresses and cause execution to be redirected to optimized code. Alternatively, an entire program may be regenerated to include optimized code.

Patching code can be problematic, if, for example, a patch being inserted in original code is longer than a portion of the code that is being replaced (as subsequent code may be overwritten). For example, overwriting subsequent code with a portion of a patch may introduce unpredictable behavior or errors into a program. Overwriting subsequent code with a portion of a patch may be particularly problematic in systems that employ variable length instruction encodings where a minimum length instruction is being patched.

SUMMARY

A technique of modifying a code sequence for a processor includes identifying a set of one or more target instructions in the code sequence. A replacement instruction is selected that includes a set of replacement instruction parts. A length of each of the replacement instruction parts corresponds to a minimum instruction length for an instruction set of the processor. The replacement instruction parts include a first instruction type and one or more second instruction types that are each configured as exception instructions if processed in isolation from the first instruction type. The replacement instruction is then substituted for the set of one or more target instructions in the code sequence for processing by the processor.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

FIGS. 2a, 2b, and 2c are schematic illustrations of sets of instructions that may be processed by the processor of FIG. 1.

DETAILED DESCRIPTION

As will be appreciated by one of ordinary skill in the art, the present invention may be embodied as a method, system, device, or computer program product. Accordingly, the present invention may take the form of an embodiment including hardware, an embodiment including software (including firmware, resident software, microcode, etc.) or an embodiment combining software and hardware aspects that may all generally be referred to herein as a circuit, module, or system. The present invention may, for example, take the form of a computer program product on a computer-usable storage medium having computer-usable program code.

Any suitable computer-usable or computer-readable storage medium may be utilized. The computer-usable or computer-readable storage medium may be, for example, but is not limited to, an electronic, magnetic, optical, electromagnetic, infrared, or semiconductor system, apparatus, or computer-readable storage device. More specific examples (a non-exhaustive list) of the computer-readable storage medium include: a portable computer diskette, a hard disk, a random access memory (RAM), a read-only memory (ROM), an erasable programmable read-only memory (EPROM) or flash memory, a portable compact disc read-only memory (CD-ROM), an optical storage device, or a magnetic storage device. As may be used herein the term "coupled" includes a direct electrical connection between elements or blocks and an indirect electrical connection between elements or blocks achieved using one or more intervening elements or blocks.

Figure 1:
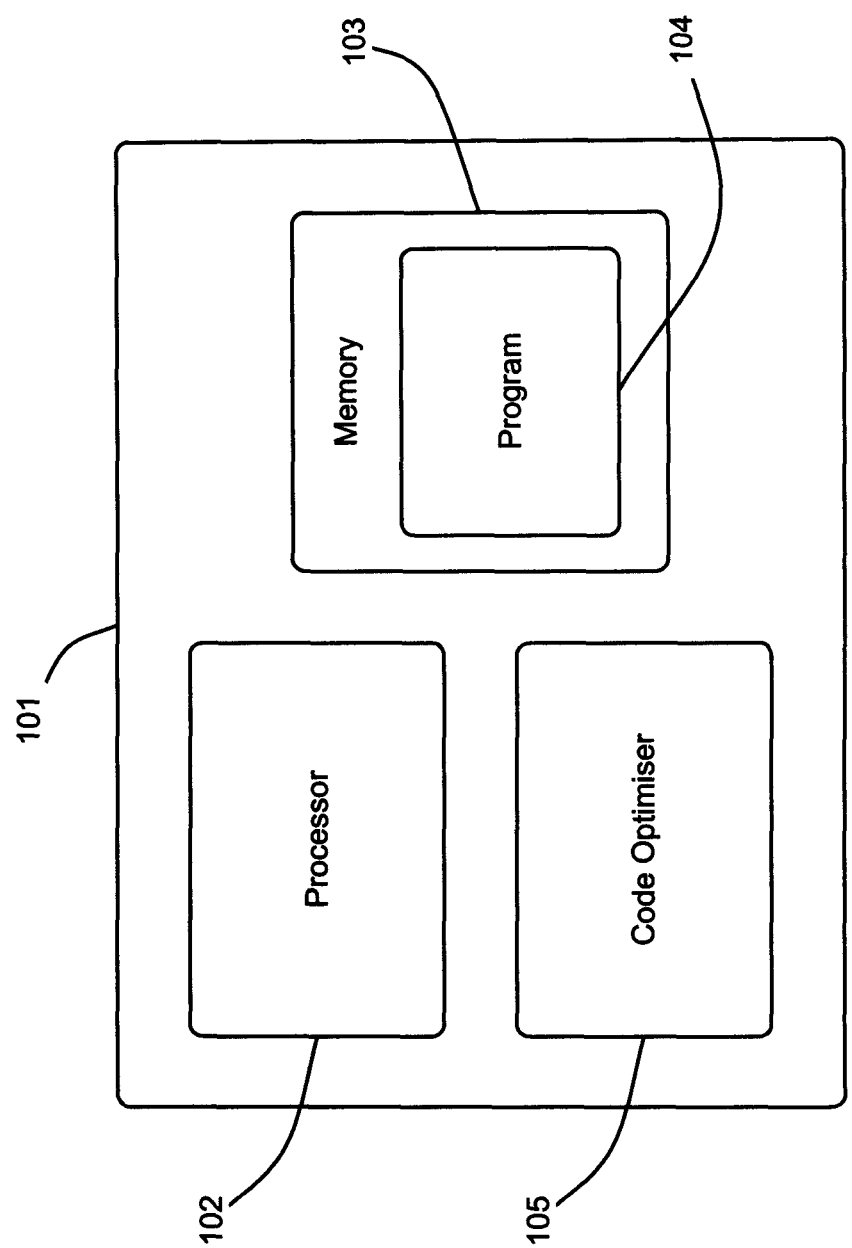
FIG. 1 is a schematic illustration of a computer system that includes a processor and a code optimizer module configured according to the present disclosure.

With reference to FIG. 1, a computer system 101 comprises a processor 102 and memory 103, which is used to store a program 104 for execution on processor 102. Program 104 is provided in machine-code, which comprises a sequence of instructions to be executed in accordance with an instruction set of processor 102. According to the present disclosure, computer system 101 includes a code optimizer module 105, which is configured to dynamically optimize the machine-code of program 104. In one or more embodiments, optimizer module 105 is configured to optimize the machine-code of program 104 during processing by processor 102.

Optimizer module 105 is configured to identify original groups of one or more instructions in program 104 and to substitute an alternative set of one or more instructions for any such identified original groups of one or more instructions. According to the present disclosure, the alternative set of instructions may be configured to provide an alternative or modified function to the original set of instructions or to provide the same function with improved performance. An exemplary sample of code from program 104 is shown in FIG.

2a with an address of each instruction indicated on the left-hand side and an explanation of its function on the right-hand side. In a disclosed embodiment, an architecture of the instruction set specifies a minimum 8-bit (one byte) instruction length. The architecture also provides variable length instructions to provide for more complex instructions that include a plurality of bytes. In the example of FIG. 2a, the code segment includes a one-byte addition instruction (at address 0), followed by a one-byte multiply instruction (at address 1), a three-byte jump instruction (at address 2), a one-byte subtract instruction (at address 5), and another one-byte multiply instruction (at address 6).

A known mechanism for optimizing a code section is to insert a jump instruction into the code section to cause processing to jump to a specified address (at which an alternative code sequence is located). The alternative code sequence is then processed, at which point processing commonly returns to the original code sequence at a predetermined point. FIG. 2b shows an example of a three-byte jump instruction (that causes a jump to address 5555) inserted at address 0. For example, when the code sequence is processed, processing jumps to address 5555, executes an optimized code sequence, and then returns to address 6 to continue normal execution. It should be appreciated that the inserted jump instruction occupies three-bytes of the instruction sequence. At some other point in program 104, another jump instruction may be present that causes processing to jump directly to, for example, address 2. However, as the code at this address has been altered by the inserted jump address, execution will be different from that expected when programming the other jump instruction. As a result, program 104 is likely to cause the application to perform incorrectly as the code has been effectively corrupted by the inserted jump instruction. In general, neither known optimizer modules nor programs have been configured to be able to detect or recover from such erroneous processing.

According to the present disclosure, optimizer module 105 is configured to encode an inserted instruction that includes multiple bytes in a manner that facilitates identification of possible corruption of subsequent code. According to various embodiments, a first byte of an inserted multi-part instruction (MPI) includes an identification of the instruction and an indication that the instruction is a multi-byte instruction. Subsequent bytes of the MPI are configured to provide the remaining parts of the multi-byte instruction, such as instruction data. Furthermore, according to the present disclosure, each such subsequent byte is also configured, if processed in isolation, as an exception or trap instruction. FIG. 2c shows an example of a multi-byte instruction, which comprises a first byte FF, which identifies the instruction as a multi-byte jump instruction and a sequence of four subsequent bytes. As is illustrated, a first half of all four subsequent bytes begin with an 'E', indicating that the instruction is a trap instruction if processed in isolation. A second half of each of the subsequent bytes is used to encode part of the jump destination address.

In the example of FIG. 2c, when processing reaches address 0 the new jump instruction to address 5555 is performed and the alternative code at that address is then processed. However, if processing jumps to, for example, address 2, where a part of the multi-part jump instruction has been substituted for the original code sequence, the instruction E5 is executed. As noted above, as E5 is a trap instruction, execution halts and a trap handler is invoked. According to various aspects of the present disclosure, the trap handler operates under the control of optimizer module 105. In response to the E5 trap instruction, optimizer module 105 is configured to re-substitute the replacement multi-part jump instruction with the original sequence of code targeted by optimizer module 105. In this manner, optimizer module 105 allows the program to continue executing from address 2 (as if the code sequence was unmodified). In general, re-substitution avoids the issue described above with respect to FIG. 2b, which occurs when a substituted MPI overwrites other instructions that are the target of an unknown jump instruction from another part of program 104.

Figure 3:
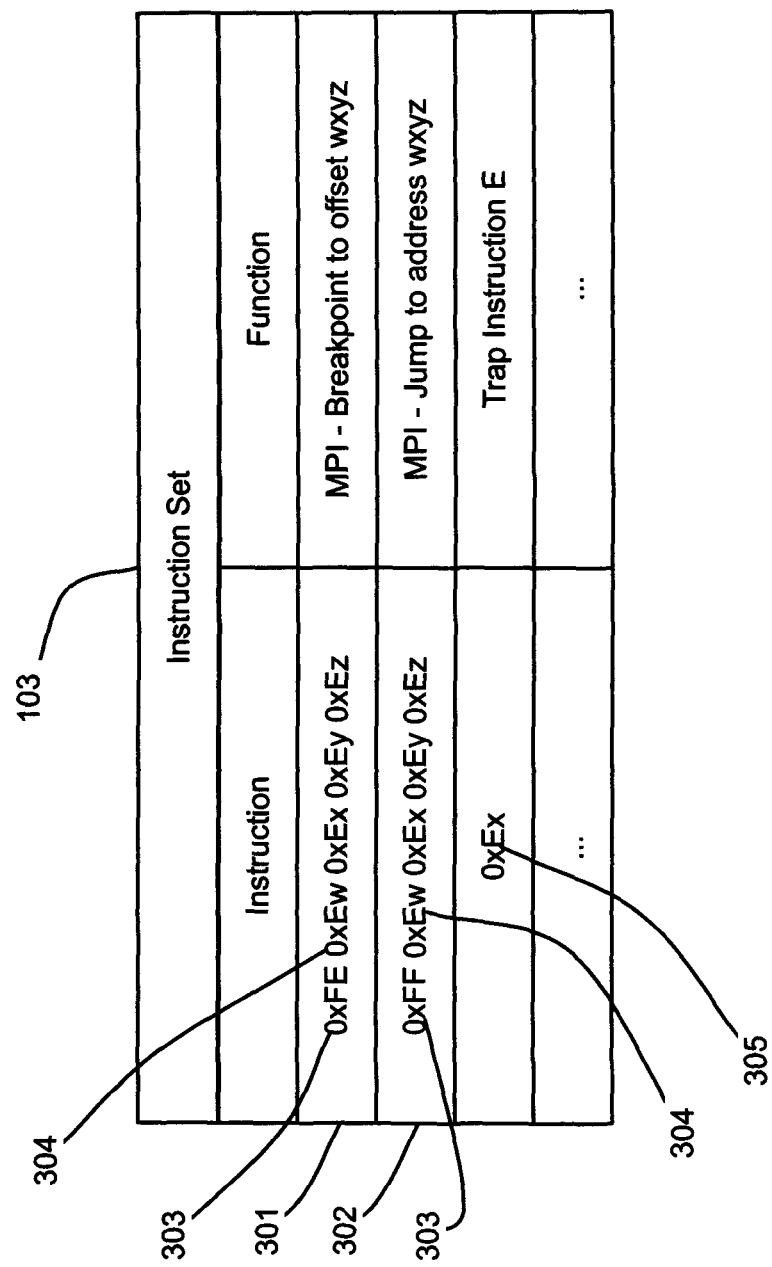
FIG. 3 is a table illustrating instructions in an instruction set of the processor of FIG. 1.

With reference to FIG. 3, in order to enable multi-part instructions (MPIs) as exemplified with respect to FIG. 2c above, the instruction set for processor 102 is provided with a set of corresponding instructions. According to the present disclosure, as shown in FIG. 3, two MPIs are provided in the form of a breakpoint instruction (FE) 301 and a jump instruction (FF) 302. Each such MPI comprises a first part 303 and one or more second parts 304. In the exemplary embodiment, breakpoint instruction 301 and jump instruction 302 each include four second parts 304. As noted above, each second part 304 is interpreted as an exception instruction 305 when processed in isolation and as a data carrying part of an MPI when processed in combination with first part 303.

Figure 4:
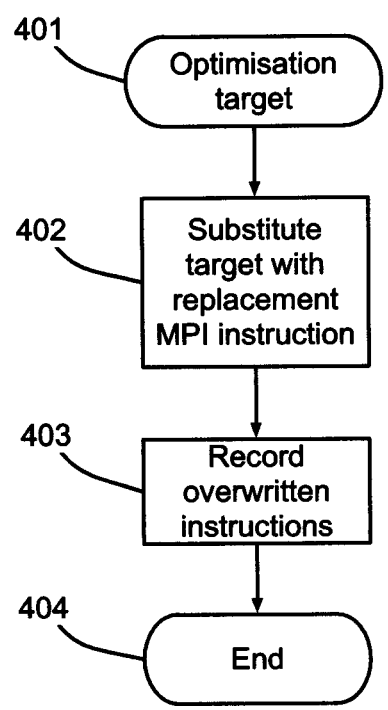
FIG. 4 is a flow chart illustrating the processing performed by the optimizer module of FIG. 1.

With reference to FIG. 4, an exemplary process performed by optimizer module 105 during code sequence optimization is illustrated. The process is initiated at block 401 in response to identification of an optimization target set of one or more instructions in a code sequence. Then, at block 402, a replacement MPI is substituted for the target instructions. Next, at block 403, the removed target instructions and any subsequent overwritten instructions are recorded for later use, if needed. Following block 403, the process ends in block 404.

Figure 5:
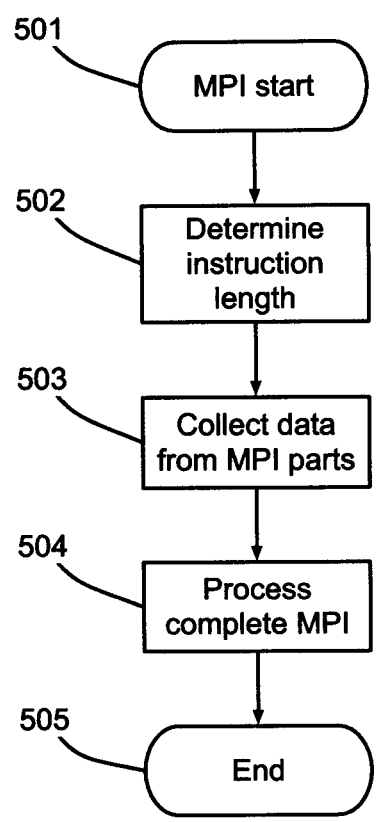
FIG. 5 is a flow chart illustrating the processing performed by the processor of FIG. 1 in response to combinations of the instructions of FIG. 3.

With reference to FIG. 5, a process performed by processor 102 when processing an MPI (which is indicated by first parts 301, 302) is depicted. The process is initiated at block 501 in response to the identification of an MPI first part (e.g., an 'FE' or an 'FF') 303 in a code sequence. Next, at block 502, a length of the MPI is determined and associated second parts 304 are retrieved. Then, at block 503, data is collected from MPI second parts 304 and processing moves to block 504. At block 504, the completed MPI is processed in accordance with the instruction set. Following block 504, the process ends in block 505.

Figure 6:
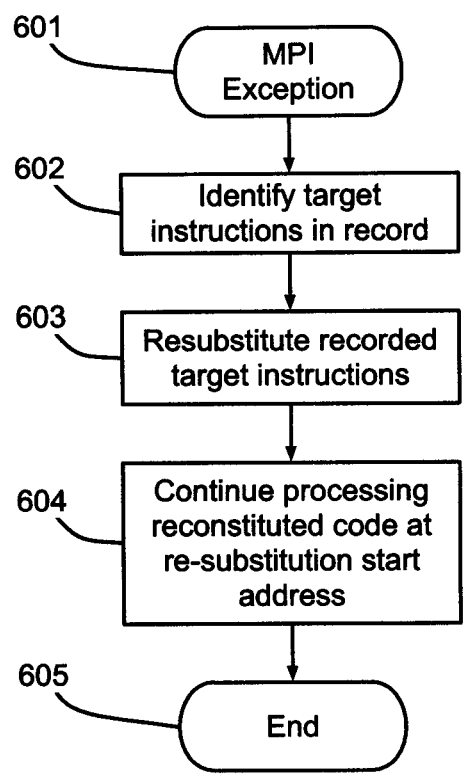
FIG. 6 is a flow chart illustrating further processing performed by the optimizer module of FIG. 1.

With reference to FIG. 6, an exemplary MPI exception instruction process (that is performed by optimizer module 105) is illustrated. The process is initiated at block 601 in response to the receipt of an MPI exception (generated by processor 102 in response to identification of an isolated MPI second part 304 in a code sequence). Next, in block 602, target instructions for which the MPI was substituted are identified from the record of removed target instructions and any subsequent overwritten instructions (see FIG. 4). Then, in block 603, the removed target instructions and any subsequent overwritten instructions (replaced by the substituted MPI) are reinstated in the code sequence. Next, in block 604, processing resumes at the appropriate point in the reinstated target instructions. Finally, in block 605, processing of the MPI exception by optimizer module 105 ends.

In another embodiment, the second part of the MPI in the form of the MPI exception instruction may be configured to cause the processor or optimizer to revert to a user for resolution prior to or as an alternative to the reversion of the code sequence to its form prior to the insertion of the MPI. In another embodiment, the occurrence of the MPI exception may be logged for subsequent analysis while processing continues uninterrupted. As will be understood by those skilled in the art, any instruction may be encoded as an MPI as described above. An MPI may comprise two or more parts.

The MPI parts may have an instruction length of the minimum instruction length for the relevant processor. As will be understood by those skilled in the art, embodiments may be applied to dynamic or static optimization of a code sequence for processing by a processor. The instructions referred to above may also be termed operation codes or opcodes.

Accordingly, techniques for modifying a code sequence have been disclosed herein that advantageously allow recovery when an instruction in the code sequence causes a branch into a multi-part instruction that has been substituted for one or more original instructions of the code sequence.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," (and similar terms, such as includes, including, has, having, etc.) are open-ended when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of modifying a code sequence for a processor, the method comprising:
    identifying a set of one or more target instructions in the code sequence;
    selecting a replacement instruction that includes a set of replacement instruction parts, wherein the replacement instruction, when utilized, causes the processor to execute the replacement instruction in place of the set of one or more target instructions, the replacement instruction including the first instruction part and one or more second instruction parts, wherein a length of each of the first and second instruction parts corresponds to a minimum instruction length for an instruction set of the processor, and wherein the first instruction part is a type of instruction that identifies the replacement instruction and provides an indication that the replacement instruction is a multipart instruction, wherein the first and second instruction parts are processed in combination to perform a single combined function that includes the first and second instruction parts, and the one or more second instruction parts are each configured as exception or trap instructions if processed in isolation from the first instruction part by being jumped to such that the first instruction part is not executed prior to executing the second instruction part; and
    substituting the replacement instruction for the set of one or more target instructions in the code sequence for processing by the processor.

2. The method of claim 1, further comprising recording the set of one or more target instructions for later use, wherein the exception instructions, when processed in isolation, cause a section of the code sequence that was replaced by the set of replacement instruction parts to be processed by the processor.

3. The method of claim 1, wherein the set of replacement instruction parts is a sequence of a first instruction part of the first instruction type followed by one or more second instruction parts of the second instruction type which are configured as a data carrying part of the multipart instruction when processed in combination with the first instruction part.

4. The method of claim 1, wherein the set of replacement instruction parts is configured to enable the processor to extract the replacement instruction for processing.

5. The method of claim 1, wherein the first and second instruction parts are configured as instruction types that are included in the instruction set of the processor.

6. The method of claim 1, wherein the instructions are machine-code instructions.

7. The method of claim 1, wherein the set of target instructions is selected for optimization.

8. The method of claim 1, performed dynamically during the processing of the code sequence by the processor.

9. A computer system comprising:
    a processor configured to execute a code sequence; and
    a code optimizer module that executes on the processor and which is configured to:
    identify a set of one or more target instructions in the code sequence;
    select a replacement instruction that includes a set of replacement instruction parts, wherein the replacement instruction, when utilized, causes the processor to execute the replacement instruction in place of the set of one or more target instructions, the replacement instruction including the first instruction part and one or more second instruction parts, wherein a length of each of the first and second instruction parts corresponds to a minimum instruction length for an instruction set of the processor, and wherein the first instruction part is a type of instruction that identifies the replacement instruction and provides an indication that the replacement instruction is a multipart instruction, wherein the first and second instruction parts are processed in combination to perform a single combined function that includes the first and second instruction parts, and the one or more second instruction parts are each configured as exception instructions if processed in isolation from the first instruction part by being jumped to such that the first instruction part is not executed prior to executing the second instruction part; and substitute the replacement instruction for the set of one or more target instructions in the code sequence for processing by the processor.

10. The computer system of claim 9, wherein the code optimizer module is further configured to record the set of one or more target instructions for later use, wherein the exception instructions, when processed in isolation, cause a section of the code sequence that was replaced by the set of replacement instruction parts to be processed by the processor.

11. The computer system of claim 9, wherein the set of replacement instruction parts is a sequence of a first instruction part of the first instruction type followed by one or more second instruction parts of the second instruction type which are configured as a data carrying part of the multipart instruction when processed in combination with the first instruction part.

12. The computer system of claim 9, wherein the set of replacement instruction parts is configured to enable the processor to extract the replacement instruction for processing.

13. The computer system of claim 9, wherein the first and second instruction parts are configured as instruction types that are included in the instruction set of the processor.

14. The computer system of claim 9, wherein the instructions are machine-code instructions.

15. The computer system of claim 9, wherein the set of target instructions is selected for optimization.

16. The computer system of claim 9, wherein the code optimizer executes dynamically during the processing of the code sequence by the processor.

17. A computer program product for modifying a code sequence for a processor, comprising:
a computer-readable storage medium; and
computer program code embodied on the computer-readable storage medium, wherein the computer program code, when executed on the processor, is configured to:
identify a set of one or more target instructions in the code sequence;

select a replacement instruction that includes a set of replacement instruction parts, wherein the replacement instruction, when utilized, causes the processor to execute the replacement instruction in place of the set of one or more target instructions, the replacement instruction including the first instruction part and one or more second instruction parts, wherein a length of each of the first and second instruction parts corresponds to a minimum instruction length for an instruction set of the processor, and wherein the first instruction part is a type of instruction that identifies the replacement instruction and provides an indication that the replacement instruction is a multipart instruction, wherein the first and second instruction parts are processed in combination to perform a single combined function that includes the first and second instruction parts, and the one or more second instruction parts are each configured as exception instructions if processed in isolation from the first instruction part by being jumped to such that the first instruction part is not executed prior to executing the second instruction part; and substitute the replacement instruction for the set of one or more target instructions in the code sequence for processing by the processor.

18. The computer program product of claim 17, wherein the program code includes code that, when executed on the processor, is configured to record the set of one or more target instructions for later use, wherein the exception instructions, when processed in isolation, cause a section of the code sequence that was replaced by the set of replacement instruction parts to be retrieved and processed by the processor.

19. The computer program product of claim 17, wherein the set of replacement instruction parts is a sequence of a first instruction part of the first instruction type followed by one or more second instruction parts of the second instruction type which are configured as a data carrying part of the multipart instruction when processed in combination with the first instruction part.

20. The computer program product of claim 17, wherein the set of replacement instruction parts is configured to enable the processor to extract the replacement instruction for processing.

* * * * *